Feb. 4, 1958 G. J. ROTEN 2,822,530
TIRE PRESSURE INDICATING SYSTEM
Filed Feb. 17, 1956 3 Sheets-Sheet 1
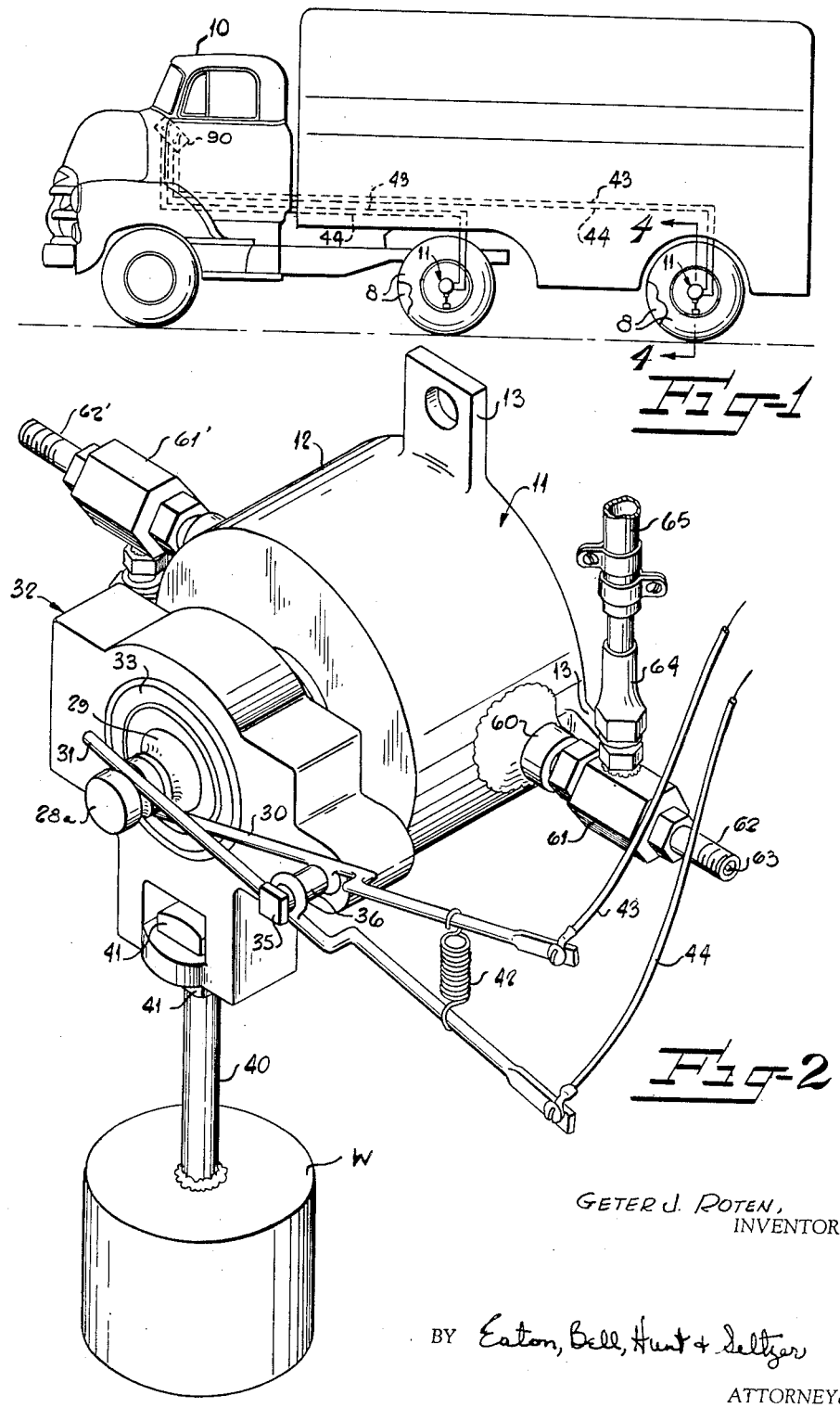
GETER J. ROTEN,
INVENTOR,
BY Eaton, Bell, Hunt & Seltzer
ATTORNEYS Feb. 4, 1958
G. J. ROTEN
2,822,530
TIRE PRESSURE INDICATING SYSTEM
Filed Feb. 17, 1956
3 Sheets-Sheet 2
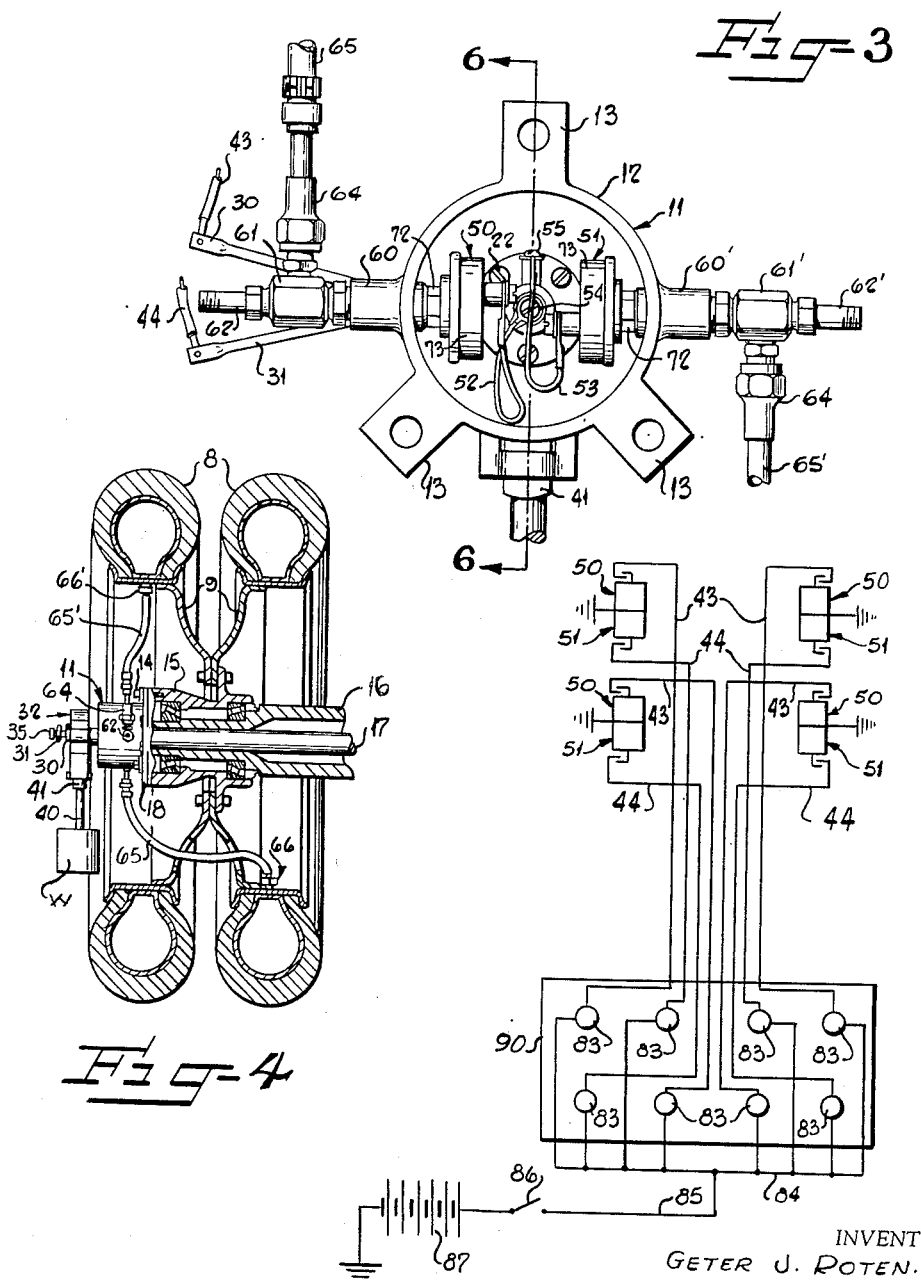
INVENTOR:
GETER J. ROTEN.
BY Eaton, Bell, Hunt + Seltzer
ATTORNEYS Feb. 4, 1958 G. J. ROTEN 2,822,530
TIRE PRESSURE INDICATING SYSTEM
Filed Feb. 17, 1956 3 Sheets-Sheet 3

INVENTOR:
GETER J. ROTEN
BY Eaton, Bell, Hunt + Seltzer
ATTORNEYS

United States Patent Office 2,822,530
Patented Feb. 4, 1958

2,822,530

TIRE PRESSURE INDICATING SYSTEM

Geter J. Roten, Creston, N. C.

Application February 17, 1956, Serial No. 566,271

7 Claims. (Cl. 340—58)

This invention relates to tire pressure gauges and, more particularly, to a tire pressure gauge for automatically warning the driver of a vehicle upon the pressure in any of the tires falling below a predetermined amount.

It is the primary object of this invention to provide an improved tire pressure indicating device adapted to be mounted as an auxiliary unit on the hubs of dual wheeled vehicles without changing or modifying any of the parts of the vehicle and wherein the device will instantly warn the operator of the vehicle of dangerous low pressure in any tire on the vehicle.

A more specific object of the invention is to provide a tire pressure indicating system for dual wheel powered vehicles wherein a tire pressure indicator is mounted on the hubs of each pair of wheels and each indicator comprises a pair of pressure actuated switches having a pair of electrical contacts adapted to close a circuit to one of a plurality of lamps positioned on the dashboard of the vehicle if the pressure in any tire falls below a predetermined amount.

Another object of this invention is to provide novel means for completing the electrical circuit from the electrical contacts in the switches to the lamps positioned on the dashboard of the vehicle.

A further object of this invention is to provide a tire pressure indicating device which can quickly be removed, if desired, when a tire on the vehicle is being changed by merely loosening a few bolts holding the indicating device to the hub of the wheel.

Some of the objects of the invention having been stated, other objects will appear as the description proceeds when taken in connection with the accompanying drawings, in which—

Figure 1 is a side elevation of a heavy duty truck having dual wheels with the tire pressure indicating system applied thereto;

Figure 2 is an enlarged perspective view of one of the tire pressure indicating devices;

Figure 3 is a rear elevation of the indicating device on a reduced scale looking from the rear of Figure 2 with parts broken away;

Figure 4 is an enlarged vertical section taken substantially along line 4—4 of Figure 1;

Figure 5 is a diagrammatic lay-out of the electrical circuit for selectively energizing the plurality of lamps positioned on a panel in the cab of the truck;

Figures 6, 7, 8:
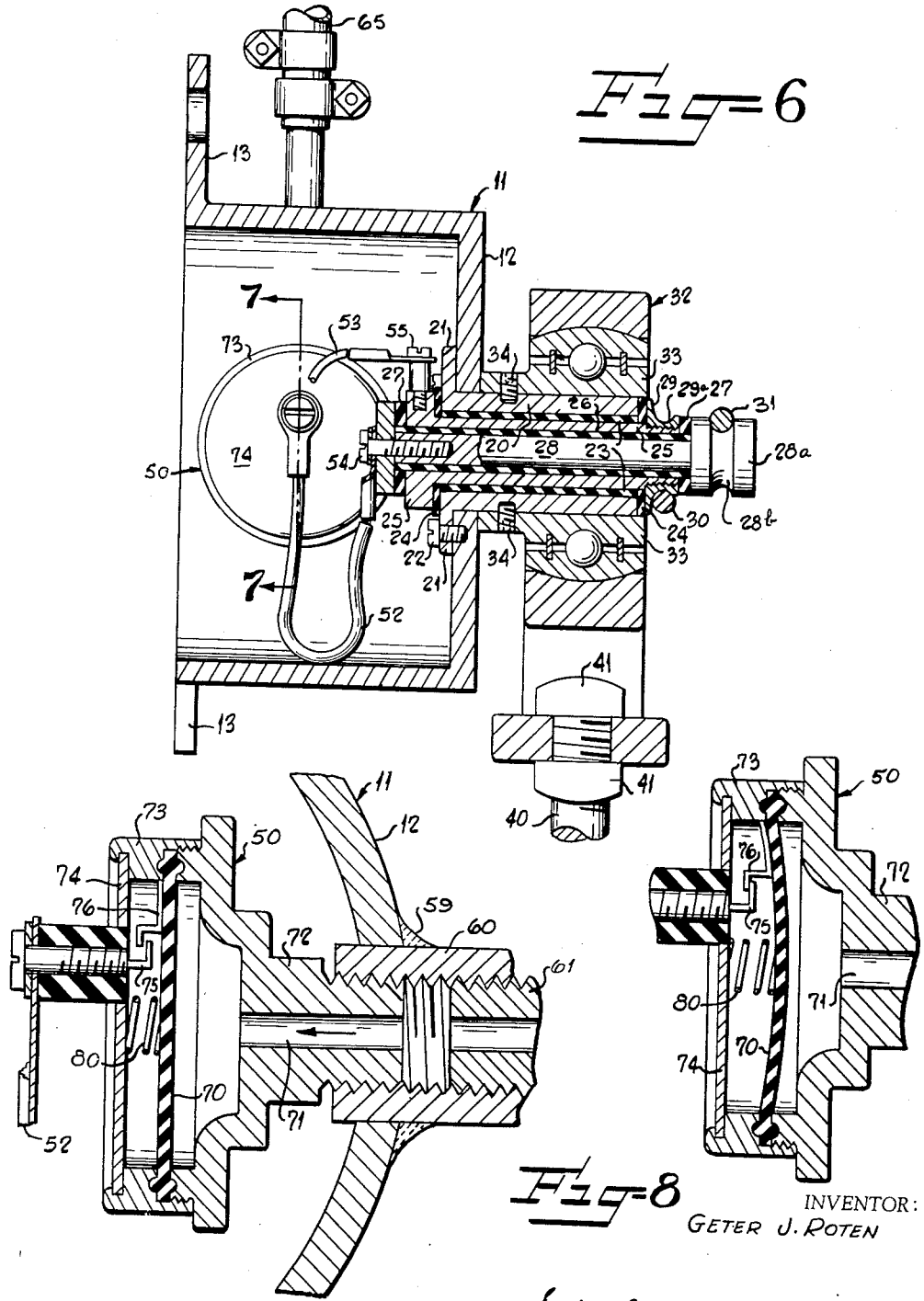
Figure 6 is an enlarged vertical section taken on line 6—6 of Figure 3.
Figure 7 is an enlarged fragmentary vertical section taken on line 7—7 of Figure 6 and showing the internal arrangement of the parts of one of the pressure switches in open circuit position.
Figure 8 is a fragmentary sectional view similar to Figure 7 but with parts omitted and showing the parts of the pressure switch in closed circuit position as when pressure in one of the tires is below a predetermined amount.

Referring more specifically to the drawings, reference numeral 10 indicates a powered vehicle in the form of a heavy duty truck having pairs of dual wheels 9 with pneumatic tires 8 on the rear portion thereof to which a plurality of tire pressure indicating devices 11 are applied. Each of the tire pressure indicating devices 11 is positioned as a separate unit or auxiliary unit to the outer surface of the hub of each of the pairs of dual wheels 9. Each of the indicator devices 11 comprises an annular housing 12 having a plurality of circularly-arranged flange members 13 extending from its periphery, which members are provided with apertures or holes for receiving securing or mounting bolts 14 (Figure 4) which are threadably received in a hub 15 to which the wheels 9 are secured. The hub 15 is conventionally secured to a plate 18 which is secured to a wheel axle 17 positioned inside of a stationary axle housing 16. Bearings are provided intermediate the housing 16 (Figure 4) and hub 15 to permit the hub and indicating device 11 carried thereby to be rotated with the axle 17.

A bearing block support 20 (Figure 6) in the form of a sleeve having a flange 21 on its inner end is suitably secured to the inner face of the housing 12 as by bolts 22. The support 20 extends outwardly beyond the housing 12 and is insulatably secured from an inner conductor sleeve or tubular member 25 by an insulating sleeve 23 interposed therebetween and by insulating washers 24 positioned at each end of the support 20. An insulating member 26 and collars 27 at each end thereof insulate the tubular conductor member 25 from a conductor shaft 28 having an enlarged end portion 28a provided with a groove or track 28b in the medial portion thereof. A metallic collar 29 is threadably secured to the tubular conductor member 25 between the outer washers 24 and 27 and is provided with a groove or track 29a in the medial portion of its periphery for reasons shortly to be explained.

A bearing block broadly indicated at 32 has its inner race 33 suitably secured by screws 34 to the support 20. A bolt 35 is secured to the outer face of the bearing 32 and carries an insulating collar 36 which insulates brushes 30, 31 from each other and from the bearing block 32. The outer ends of the brushes 30, 31 are positioned in the grooves 28b, 29a provided in the collar 29 and the shaft 28.

To prevent the bearing block 32 from rotating and to maintain the same stationary upon movement being imparted to the vehicle, a weight W is secured to the lower portion of the bearing block by a rod or spindle 40 being secured thereto by a pair of locking nuts 41. It is apparent that the weight W prevents rotation of the bearing block 32 to prevent disruption of the electrical circuit maintained by the brushes 30, 31 respectively.

The outer ends of the brushes 30, 31 are provided with a spring 42 having an insulating material on its opposite ends for maintaining the inner ends of the brushes in contact with the collar 29 and the enlarged shaft end 28a, respectively, by a scissors-like action to always maintain a good electrical contact therebetween. Conductors 43, 44 secured to the outer ends of the brushes 30, 31, respectively, are connected to a suitable warning device in the form of a lamp 83 positioned in a panel 90 in the cab of the vehicle as shown diagrammatically in Figures 1 and 5.

A pair of pressure switches broadly indicated at 50, 51 are positioned inside the confines of the housing 12 and conductors 52, 53 electrically connect the pressure switches of the conductor shaft 28 and the tubular conductor member 25, respectively, by means of screws 54, 55. It is apparent that the tubular insulating member 23 and insulating washers 24 prevent grounding of the circuit leading to the pressure switch 51, and the insulating tubular member 26 and washers 27 prevent grounding of the circuit leading to the pressure switch 50.

Now referring more specifically to Figure 3, the pressure switches 50, 51 are secured opposite each other in the side wall of the housing 12 by internally threaded air conduits or passageways 60, 60', respectively. As will be observed in Figure 7, these air passageways 60, 60' are secured to the housing 12 by any suitable means such as a weld 59. One end of a hollow coupling 61 is secured to the passageway 60 and the other end of the coupling 61 is secured to a valve stem 62 in which is positioned a valve core 63 (Figure 2). Leading upwardly from the coupling 61 is a hollow connector 64 serving to permit air pressure to flow from one of the tires 8 through a hose connection 65 to the pressure switch 50. A connector 66 is interposed between the hose 65 and the valve stem of the tire 8 to depress the valve core in the tire to permit the full pressure of the air therein to be exerted against a resilient member or diaphragm 70 positioned in the medial portion of the pressure switch 50.

The means for connecting the switch 51 to the other tire are the same as the means connecting switch 50 and therefore the same reference numerals with the prime notation added thereto have been used.

Since each of the pressure switches 50, 51 are identically constructed, a description of only one pressure switch will now be given which is deemed to be sufficient for purposes of this invention.

Now referring more particularly to Figure 7, the pressure switch 50 is shown which comprises a housing formed by a back wall portion 72 threadably secured to a side wall portion 73. Secured to the front end of the side wall portion 73 is a cover 74 in which is positioned a stationary contact 75. A resilient diaphragm 70 is clampingly secured between the back wall portion 72 and the side wall portion 73 and receives the pressure from the corresponding tire through a passageway 71 provided in the back wall 72, which passageway is communicatively connected to the tire.

A movable contact 76 grounded to the housing is positioned in engagement with the diaphragm 70 so as to be moved and normally held by the same out of engagement with a stationary contact 75 (Figure 7) when the pressure in the corresponding tire is of a predetermined amount. A spring 80 is positioned between the cover 74 and diaphragm 70 to insure the movement of the diaphragm 70 to the position shown in Figure 8 when the pressure in the corresponding tire falls below a predetermined amount. In this position, the movable contact 76 engages the stationary contact 75 to close the circuit to the corresponding indicating lamp 83 positioned in the cab of the vehicle.

In Figure 5 is a diagrammatic lay-out of the electrical circuit to the four pairs of dual tires (only two shown in Figure 1) on the powered vehicle 10 with a tire pressure indicating device 11 applied to each of the pairs of dual wheels. As shown in Figure 5, pairs of pressure switches 50, 51 each suitably grounded are connected by conductors 43, 44, respectively, to illuminating lamps 83 connected in parallel to a branch conductor 84 which is connected to a main conductor 85 having an ignition switch 86 interposed therein which switch is electrically connected to a battery 87 suitably grounded to the vehicle. The bulbs or illuminating lamps 83 are preferably positioned in the panel 90 which is positioned on the dash of the powered vehicle 10 so as to be readily observed by the operator of the same when the pressure in any of the tires falls below a predetermined desired amount. It will be readily apparent that the lamps or bulbs 83 will not be energized unless the pressure in one of the tires falls below a predetermined amount so as to permit the contact 76 in each of the pressure switches to engage the contact 75 and close the circuit.

In operation, if the pressure in one of the tires falls below a predetermined amount, the tire may readily be changed or repaired by disengaging the air hose 65, or 65' connecting the valve stem of the corresponding tire thereto and disconnecting the conductors 43, 44 from the brushes 30, 31, thus permitting removal of the tire from the rim. If desired, pressure may be entered into the tires 8 by placing an air pressure hose on the valve stem 62 or 62' without removing the air hoses 65, 65' from the valve stems of the tires. It is readily apparent that the pressure indicating device will in no way interfere with the changing of pressure in the tires to vary the same in accordance with changes in climatic conditions.

In summary, there has been provided an improved tire pressure indicating system to readily indicate by means of illuminating lamps positioned in the cab of the powered vehicle when the pressure in any of the tires falls below a predetermined amount and wherein each of the tire pressure indicating devices is formed as an auxiliary unit to readily be positioned on the hub of the powered vehicle without changing or modifying any of the parts of the vehicle.

In the drawings and specification there has been set forth a preferred embodiment of the invention and, although specific terms are employed, they are used in a generic and descriptive sense only and not for purposes of limitation, the scope of the invention being defined in the claims.

I claim:

1. A tire pressure indicating device adapted to be positioned on the hub of a dual wheeled vehicle having pairs of pneumatic tires comprising a housing secured to the hub of said vehicle, a pair of opposed pressure operated switches positioned in said housing, conduit means communicatively connecting each of said switches to the pressure in a different tire of a pair of tires, each of said pressure operated switches comprising a flexible diaphragm, a stationary contact, a movable contact adapted to be normally held out of engagement with the stationary contact by the force exerted on said diaphragm by the pressure in one of said tires, means contacting said diaphragm and exerting a force thereon in a direction opposite to the force exerted thereon by the pressure in said tire to insure the closing of the switch upon the pressure in the tire falling below a predetermined amount, electrical warning means positioned in the cab of the vehicle, and means electrically connecting said warning means with each of said switches whereby upon the pressure in any one of said tires dropping below a predetermined amount, the corresponding switch will be closed to energize the electrical warning means.

2. In an air pressure signalling system for pairs of pneumatic tires on dual wheeled vehicles; the combination of an annular housing secured to the hub of said wheel, a pair of opposed pressure operated switches positioned in said housing, conduit means communicatively connecting each of said switches to the pressure in a different tire of a pair of tires, each of said pressure operated switches comprising a flexible member adapted to be actuated by the pressure in the tires, a stationary contact, a movable contact positioned adjacent one side of the flexible member and normally held out of engagement with the stationary contact by the flexible member, lamps positioned in the cab of the vehicle for indicating when the pressure in the tires falls below a predetermined amount, and means mounted on said housing for maintaining an electrical circuit between the lamps and said pressure operated switches.

3. A tire pressure indicating device adapted to be positioned on the hub of a dual wheeled vehicle having pairs of pneumatic tires comprising a housing secured to the outer face of the hub of said vehicle, a pair of pressure operated switches positioned completely inside said housing, and each being communicatively connected to the pressure in a different tire of a pair of tires on one wheel, each of said pressure operated switches comprising a flexible diaphragm, a stationary contact, a movable contact adapted to be normally held out of engagement with the stationary contact by the force exerted on said diaphragm by the pressure in one of said tires, electrical warning means positioned in the cab of the vehicle, and means electrically connecting said electrical warning means with each of said switches comprising a pair of brushes positioned outside the housing adjacent its outer wall and means for supporting said brushes to prevent rotative movement of the same to avoid disruption of the electrical circuit.

4. In a powered vehicle having pairs of dual wheels with pairs of pneumatic tires mounted thereon, a tire pressure indicating system for indicating when the pressure in each of the tires falls below a predetermined amount comprising a plurality of tire pressure indicators each having a housing secured to the hubs of each of said wheels, a pair of pressure actuated switches positioned in each of said housings, and each switch of said pair of switches being communicatively connected to the pressure in a different tire of a pair of tires, each of said switches having a pair of contacts, a diaphragm normally maintaining one of said contacts displaced relative to the other when the pressure in said tire connected thereto is of a predetermined amount, lamps for indicating when the pressure in the tires falls below said predetermined amount, electrical means connecting said lamps with said switches, said electrical means comprising a shaft positioned in the front wall of said housing, a metallic sleeve surrounding said shaft, insulating means positioned between said shaft and said sleeve, said pair of switches being electrically connected to said shaft and said metallic sleeve, respectively, a bearing block surrounding said sleeve, a pair of brushes electrically connecting said sleeve and shaft, respectively, to said lamps, said brushes being insulatably secured to said bearing block, and means for preventing rotation of said bearing block and said brushes to avoid disruption of the electrical circuit.

5. A tire pressure indicating device adapted to be positioned on the hub of a dual wheeled vehicle having pairs of pneumatic tires comprising a housing secured to the outer face of the hub of said vehicle, a pair of pressure operated switches positioned in said housing and each being communicatively connected to the pressure in a different tire of a pair of tires, each of said pressure operated switches comprising a diaphragm, a stationary contact, a movable contact in frictional engagement with said diaphragm and adapted to be moved out of engagement with the stationary contact by the force exerted on the diaphragm by the pressure in the corresponding tire, spring means contacting said diaphragm and exerting a counter-force thereon to move the movable contact into engagement with the stationary contact upon the pressure in the corresponding tire falling below a predetermined amount, lamps positioned in the cab of said vehicle, means electrically connecting said lamps with each of said switches, said means comprising a shaft positioned in the front wall of said housing and electrically connected to one of said switches, a tubular member surrounding said shaft and electrically connected to the other switch, means insulating said tubular member from said shaft and said housing, a collar secured to said tubular member, a bearing block surrounding said tubular member, a pair of brushes insulatably mounted on said bearing block, one of said brushes engaging said collar, the other brush engaging said shaft, and means for preventing rotation of said bearing block to maintain said brushes stationary when the housing is rotated upon movement of the vehicle to prevent the disruption of the electrical circuit connecting the switches with said lamps.

6. A tire pressure indicating device adapted to be positioned on the hub of a dual wheeled vehicle having pairs of pneumatic tires comprising a housing secured to the hub of said vehicle, a pair of pressure operated switches positioned in said housing and each being communicatively connected to the pressure in a different tire of a pair of tires, each of said pressure operated switches comprising a diaphragm, a stationary contact, a movable contact normally held out of engagement with the stationary contact by the force exerted on said diaphragm by the pressure in one of said pair of tires, resilient means contacting said diaphragm and exerting a force thereon in a direction opposite to the force exerted thereon by the pressure in said tire, lamps positioned in the cab of said vehicle, means electrically connecting said lamps with each of said switches, said means comprising a shaft positioned in the front wall of said housing, a tubular member surrounding said shaft, said shaft and tubular member each being electrically connected to one of said pair of switches, means insulatably securing said tubular member and shaft from each other and from said housing, a bearing block surrounding said tubular member, a pair of brushes mounted on said bearing block, one of said brushes electrically connected to said tubular member, the other brush electrically connected to said shaft, and weight means for preventing rotation of said bearing block to maintain said brushes stationary upon movement being imparted to the vehicle to prevent the disruption of the electrical circuit connecting the switches with said lamps.

7. A tire pressure indicating device adapted to be positioned on the hub of a dual wheeled vehicle having pairs of pneumatic tires comprising a housing secured to the outer face of the hub of said vehicle, a pair of pressure operated switches positioned in said housing, and each being communicatively connected to the pressure in a different tire of a pair of tires on one wheel, each of said pressure operated switches comprising a flexible diaphragm, a stationary contact, a movable contact adapted to be normally held out of engagement with the stationary contact by the force exerted on said diaphragm by the pressure in one of said tires, electrical warning means positioned in the cab of the vehicle, means electrically connecting said warning means with each of said switches comprising a stationary shaft positioned in the front wall of said housing and electrically connected to one of said switches, a sleeve surrounding said shaft and electrically connected to the other switch, means insulating said shaft and sleeve from each other and said housing, a bearing block surrounding said sleeve, a pair of brushes mounted on said bearing block, one of said brushes electrically connecting said shaft, the other brush electrically connecting said sleeve, and means secured to said bearing block to prevent rotative movement of the same to avoid disruption of the electrical circuit.

References Cited in the file of this patent

UNITED STATES PATENTS

| 2,451,412 | Richbourg | Oct. 12, 1948 |
| 2,463,335 | Warnshine et al. | Mar. 1, 1949 |
| 2,550,041 | Cozzolino et al. | Apr. 24, 1951 |
| 2,633,148 | Kelly | Mar. 31, 1953 |
| 2,740,855 | Welpath et al. | Apr. 3, 1956 |